May 27, 1969  J. E. ELSWORTH  3,445,961

AGRICULTURE SPRAYING MACHINES

Filed April 27, 1967

INVENTOR
JAMES EDWARD ELSWORTH

By
Cushman, Darby & Cushman
ATTORNEYS

United States Patent Office 3,445,961
Patented May 27, 1969

3,445,961
AGRICULTURE SPRAYING MACHINES
James Edward Elsworth, Fernhurst, England, assignor to Imperial Chemical Industries Limited, London, England, a corporation of Great Britain
Filed Apr. 27, 1967, Ser. No. 634,287
Claims priority, application Great Britain, May 16, 1966, 21,570/66
Int. Cl. B05c *15/06, 1/28;* A01g *25/00*
U.S. Cl. 47—1.7                                    6 Claims

ABSTRACT OF THE DISCLOSURE

A spraying machine is provided with a pair of crop guards which are gently biased toward one another so as to shield crops in a row. Each crop guard is in the form of a dished disc made from a semi-rigid material, and each crop guard is mounted so as to be rotatable by contact with the ground.

---

This invention relates to agricultural spraying machines. More particularly, it relates to in-the-row spraying machines: i.e., machines of the type used to spray the area between the rows of growing crops. Such machines are generally used to spray herbicides to control the growth of weeds in the crop, and they are therefore usually provided with guards which shield the crop from the spray nozzles.

It has been proposed in our co-pending U.S. application Ser. No. 602,930, filed Dec. 19, 1966, to use vertical metal guards dragging along the ground. Such guards have been free to move up and down to follow irregularities in the ground, but not from side to side. It is necessary to mount such guards sufficiently far apart to allow plants to pass between them without damage. A certain margin of error must be allowed because rows are not planted, nor do plants grow, with geometrical regularity. In consequence a relatively wide unsprayed strip is left around the plants, in which weeds may continue to flourish.

The object of the present invention is to provide an in-the-row spraying machine which is able to spray a larger proportion of the ground round the crops than has hitherto been possible without damage to the crops themselves.

According to the present invention we provide an in-the-row agricultural crop spraying machine having a pair of crop guards gently biased towards contact in the region of their lower edges, and having their leading edges spaced apart to permit entry of the crop between them. Preferably the machine has more than one pair of such guards.

The bias may be static, e.g. exerted by means of springs, such as 9, or dynamic, e.g. so that the action of the ground on the guards as they pass over it biases the guards together. In a preferred form of our invention the guards are dished discs, which may be made of a semi-rigid plastic material, mounted so as to be rotatable by the ground. A dynamic bias may be imparted to such discs by mounting them with their axes at an angle to the direction of motion, i.e. so that they have "toe-in."

A specific embodiment of the invention will now be described with reference to the drawings, in which.

Figure 1:
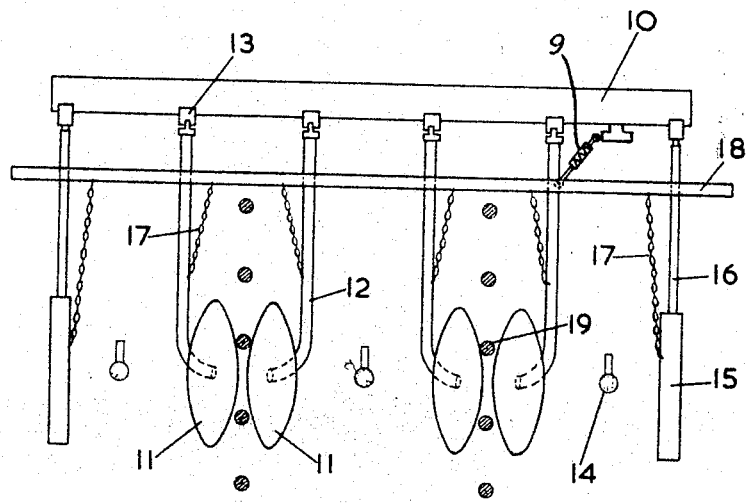
FIGURE 1 is a plan view of a device according to the invention in operation.
Figure 2:
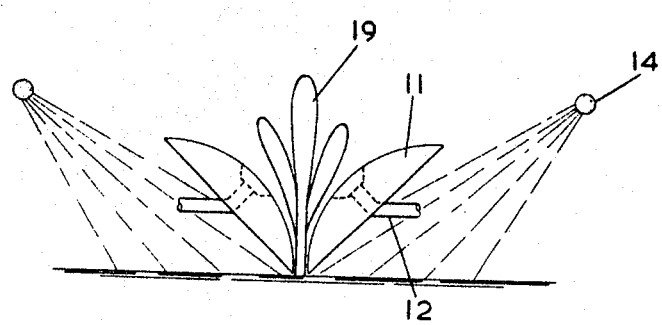
FIGURE 2 is a rear elevation view of a pair of guards as shown in FIGURE 1.
Figure 3:
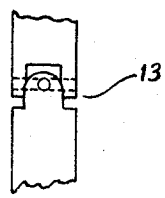
FIGURE 3 is a detailed view of a universal joint which may be used with the device of this invention.

The device comprises a tool bar 10 which is mounted on a tractor. Adjustably fixed to the tool bar 10 are pairs of guards 11. Each guard 11 is made of semi-rigid polyvinyl chloride and has the shape of a dished disc, the bottom edge of each disc being approximately vertical and the upper edge in consequence bending over towards the horizontal. The guards 11 are mounted rotatably on bent shafts 12, which are connected to the tool bar 10 by means of universal joints 13. These joints 13 consist of a horizontal and a vertical pivot, so that the shafts 12 are free to move up and down and from side to side, but cannot rotate. In this way the attitude of the guards 11 is controlled. This attitude is such that the axis of rotation of the guards 11 is at approximately 45° up from the horizontal and canted slightly back from the lateral vertical plane. Sprayheads 14 are mounted between the guards 11. These are connected by hoses (not shown) to a reservoir mounted on the tractor.

At each side of the device are fixed metal guards 15 mounted vertically and connected to the tool bar 10 by tow rods 16 and vertical hinges. The guards 15 and the shafts 12 are linked by chains 17 to a rearward transverse lifting member 18 which may be lifted to raise the guards off the ground when the device is not in use.

In operation the device is pulled through the crops by the tractor, with the guards 11 located in pairs, astride each row of crops. Each guard 11 is rotated by contact with the ground. The "toe-in" of each guard causes it to be gently biased towards its neighbour so that their lower edges are brought into contact. When any pair of guards 11 meets a plant 19, they are thrust gently apart; when the plant is passed the lower edges of the guards 11 at once come together again. The paths of the lower edges of the guards 11 define the edges of the sprayed area, and in this way the unsprayed area is reduced to the minimum.

Damage to the plants in the crop is negligible because:
(a) The bias resulting from the orientation ("toe-in") of the guards 11 is slight.
(b) The plants are pressed from both sides; they are gently squeezed rather than pushed over.

Furthermore, in the above described embodiment the curved shape of the guards and the flexibility of the material of which they are constructed further assists in lessening any possibility of damage. A useful advantage of the described embodiment is that the pairs of guides 11 are self-centering within limits; they will go round any plant which is located within the path of their forward edges.

In an alternative embodiment of the device the shafts 12 are mounted on the tool bar 10 through a vertical hinge rather than a universal joint. In this embodiment the guards as a whole are not free to move laterally, but the plant 19 is able to separate the lower edges of the guards, which are biased together solely by virtue of the resilience of the plastic material of which they are made. This embodiment is useful in certain applications, but lacks certain of the advantages of the embodiment illustrated; e.g. it is not so tolerant of irregular rows of crops.

The device of our invention may be used to spray rows of crops with herbicides of the hormone, contact or dessicant type (e.g. diquat or paraquat). It may also be useful for spraying, e.g. liquid fertiliser, where it is desirable to keep this out of contact with the growing crop.

It will be appreciated that the crops to be treated in this way must be of appropriate size and strength; obviously the device will not work on, for example, freshly emerged seeds. The device has been found to be of particular use in the treatment of young maize plants.

The sprayheads used in our device are preferably low pressure electromechanically vibrating nozzles, e.g. those that are described in U.S. Patent 3,361,352. Such sprayheads minimize drift.

What I claim is:
1. An in-the-row agricultural crop spraying machine having a pair of crop guards gently biased towards contact in the region of their lower edges, and having their leading edges spaced apart to permit entry of the crop between them, each of said crop guards being in the form of a dished disc made from a semi-rigid material, and each of said crop guards being mounted so as to be rotatable by contact with the ground.

2. A machine as claimed in claim 1 having a static crop guard bias.

3. A machine as claimed in claim 2 wherein the bias is imparted by springs.

4. A machine as claimed in claim 1 having a dynamic crop guard bias.

5. A machine as claimed in claim 4 wherein the dished discs are biased together by being mounted with their axes at an angle to the direction of motion of the sprayer.

6. A machine as claimed in claim 1 having sprayheads which are low pressure electromechanically vibrating nozzles.

References Cited

UNITED STATES PATENTS

| | | | |
|---|---|---|---|
| Re. 26,166 | 3/1967 | Inhofer | 47—1.7 |
| 512,708 | 1/1894 | Johnson | 172—158 X |
| 888,348 | 5/1908 | Nichols | 172—510 |
| 925,541 | 6/1909 | Welch | 172—510 |
| 1,028,402 | 6/1912 | Thornton | 172—157 |
| 1,663,065 | 3/1928 | Verjrosta | 172—534 |
| 2,777,379 | 1/1957 | Heath | 172—516 X |
| 2,882,982 | 4/1959 | Hobbs | 172—522 |
| 3,038,665 | 6/1962 | Doerr | 239—288 X |
| 3,040,818 | 6/1962 | Mattson | 172—49 X |
| 3,361,352 | 1/1968 | Harris | 239—102 X |

FOREIGN PATENTS 44,175   5/1931   Denmark.

ALLEN N. KNOWLES, *Primary Examiner.*

BERNARD BELKIN, *Assistant Examiner.*

U.S. Cl. X.R.

239—4, 102, 104, 288